Aug. 6, 1957 — A. H. HANSON — 2,801,861
COMBINED HAND TRUCK AND LIFT
Filed Jan. 28, 1955 — 3 Sheets-Sheet 1

INVENTOR.
ALFRED H. HANSON
BY Mock & Blum
ATTORNEYS

Aug. 6, 1957 A. H. HANSON 2,801,861
COMBINED HAND TRUCK AND LIFT
Filed Jan. 28, 1955 3 Sheets-Sheet 2

Aug. 6, 1957 A. H. HANSON 2,801,861
COMBINED HAND TRUCK AND LIFT
Filed Jan. 28, 1955 3 Sheets-Sheet 3
FIG. 5.
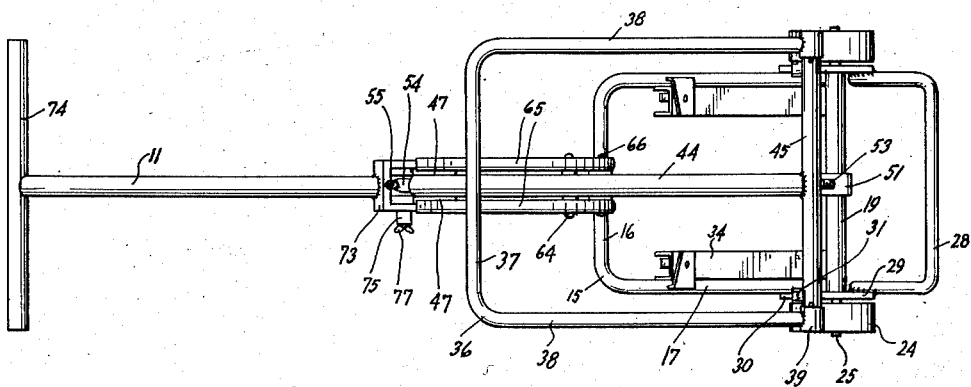
FIG. 7.
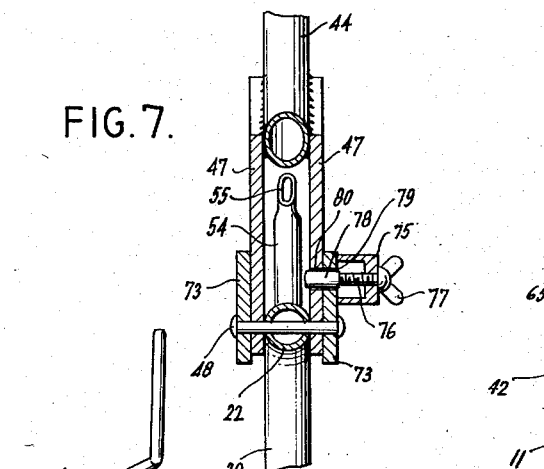
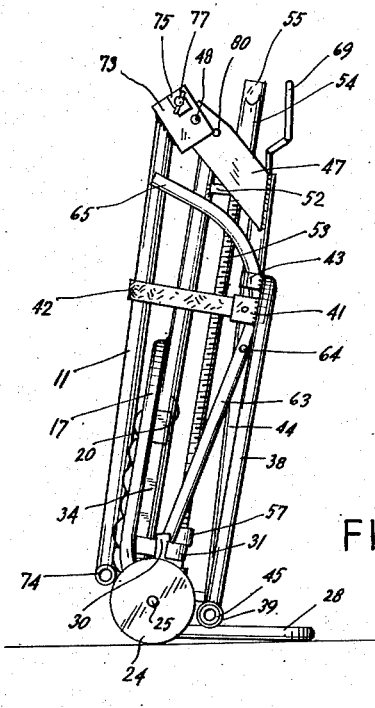
FIG. 6.
FIG. 8.
INVENTOR.
ALFRED H. HANSON
BY
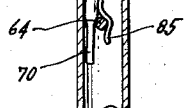
ATTORNEYS

United States Patent Office 2,801,861
Patented Aug. 6, 1957

2,801,861
COMBINED HAND TRUCK AND LIFT

Alfred H. Hanson, Garrison, N. Y., assignor to The Fairbanks Company, New York, N. Y., a corporation of New Jersey Application January 28, 1955, Serial No. 484,650

9 Claims. (Cl. 280—44)

The present invention relates to material handling equipment and is particularly directed to a combined hand-truck and lift. The hand-truck is intended especially for the transport of air-conditioning units and for raising the unit to the level of the window for the installation thereof, although it may find use for the transporting and lifting of any major appliance or other heavy load.

In the installation of air-conditioning units of the type which are mounted within a window casement, the difficulty in transporting and handling such a unit, which may weigh several hundred pounds, ordinarily requires the joint effort of at least two men. In such installation, the air-conditioning unit must first be transported to the place of installation, unpacked and the chasis removed from the casing. The casing or outer covering is then mounted in the window and the heavy chassis must be manually lifted to window level and slid into the casing. Such an operation has heretofore been difficult, burdensome, and time-consuming.

According to the present invention, an embodiment of which is illustrated in the drawings and will be described hereinafter in greater detail, there is provided a mobile frame, an article support or carriage superimposed above the frame, and an elevator structure mounting the support for up and down movement relative to the frame to raise and lower the load, as desired.

It is an object of the present invention to provide a hand-truck of the type described, which provides easy transporting and manipulation of the load, and in addition, a simple and efficient manner of raising the air-conditioner chassis to window level for the installation thereof, so that the entire operation may be performed by one man.

Another object of the present invention is to provide a hand-truck of the character and type described, which is sturdy in construction, light in weight and collapsible to a small compact condition when not in use, so as to be readily carried in one hand.

It is a further object of the present invention to provide a hand-truck of the type described which is simple in construction, inexpensive in manufacture, and durable in use, and which further effects substantial savings in labor.

Other objects and advantages of the invention will be apparent in the course of the following specification, when taken in connection with the accompanying drawings, in which:

Fig. 5 is a top plan view of the device as illustrated in Figs. 1 and 2, but with the hand crank removed therefrom.

Fig. 6 is a side elevational view showing the lift truck in its collapsed, inoperative condition;

Fig. 7 is an enlarged sectional view taken substantially along the line 7—7 of Fig. 4; and Fig. 8 is an enlarged partial sectional view showing the interior of one member adapted to receive the hand crank for storage, when not in use.

Figure 1:
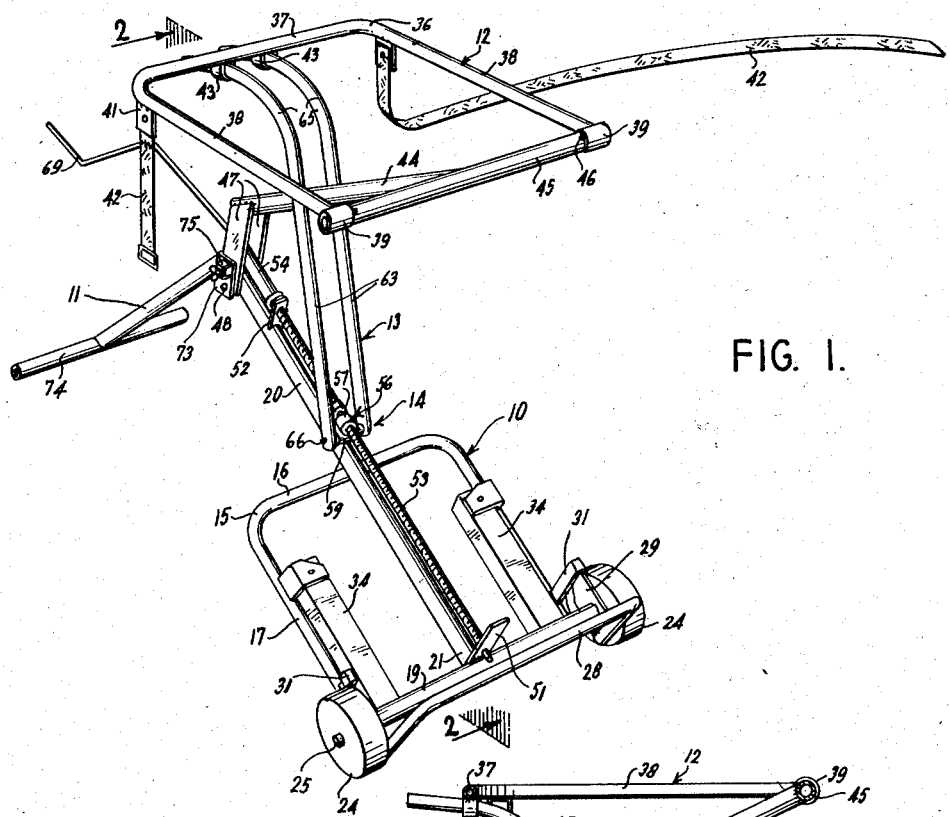
Figure 1 is a perspective view showing a hand-truck construction in accordance with the present invention, and illustrated with its carriage or supporting member in an intermediate position of elevation defining a stand or article rest.
Figure 2:
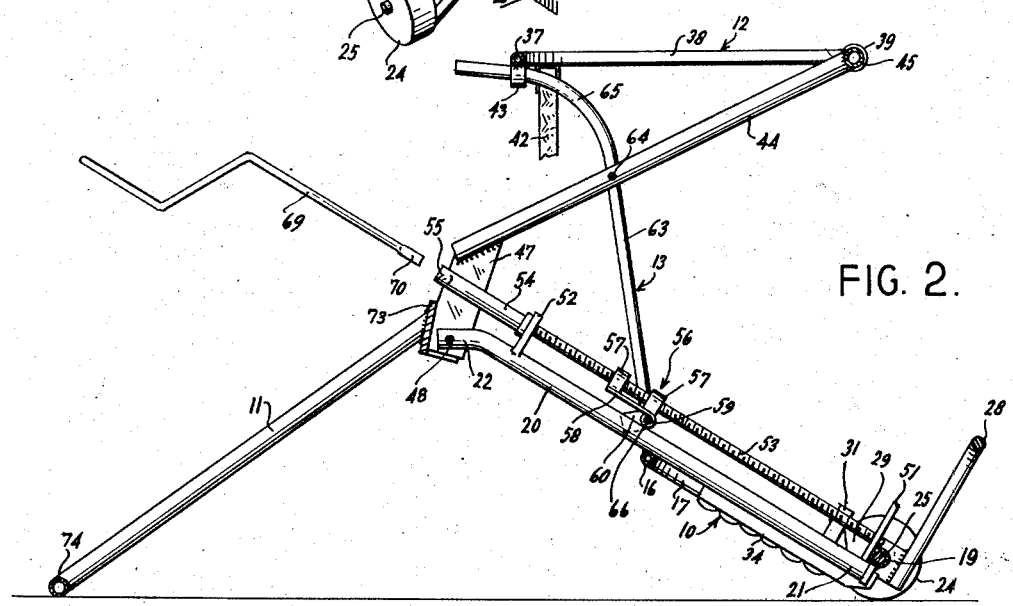
Fig. 2 is a longitudinal sectional view taken substantially along the plane 2—2 of Fig. 1.

Referring now more particularly to the drawings, and specifically to Figs. 1 and 2 thereof, the embodiment of the invention illustrated therein comprises a wheeled frame, generally designated 10, a handle 11 on one end of the frame, a supporting member or carriage, generally designated 12, disposed above the frame, and an elevator structure, generally designated 13, mounting the supporting member on the frame for up and down movement relative to the latter. Actuating means 14 is mounted on the frame 10 and connected to the elevator structure 13 to effect operation of the latter.

Figure 3:
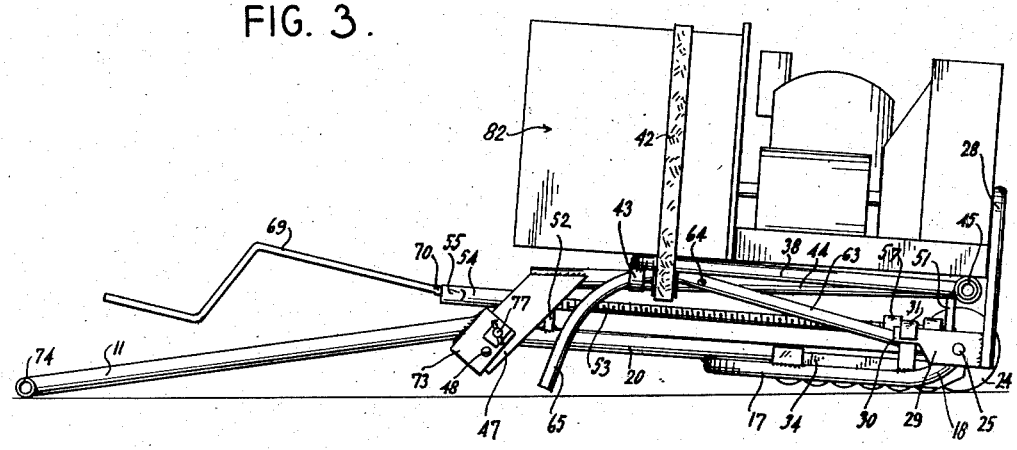
Fig. 3 is a side elevational view showing the device of Fig. 1 in an initial stage of its transformation from operation as a hand-truck to its condition of use as a stand or rest, with parts removed for clarity of understanding, and showing an air-conditioner chassis mounted thereon.
Figure 4:
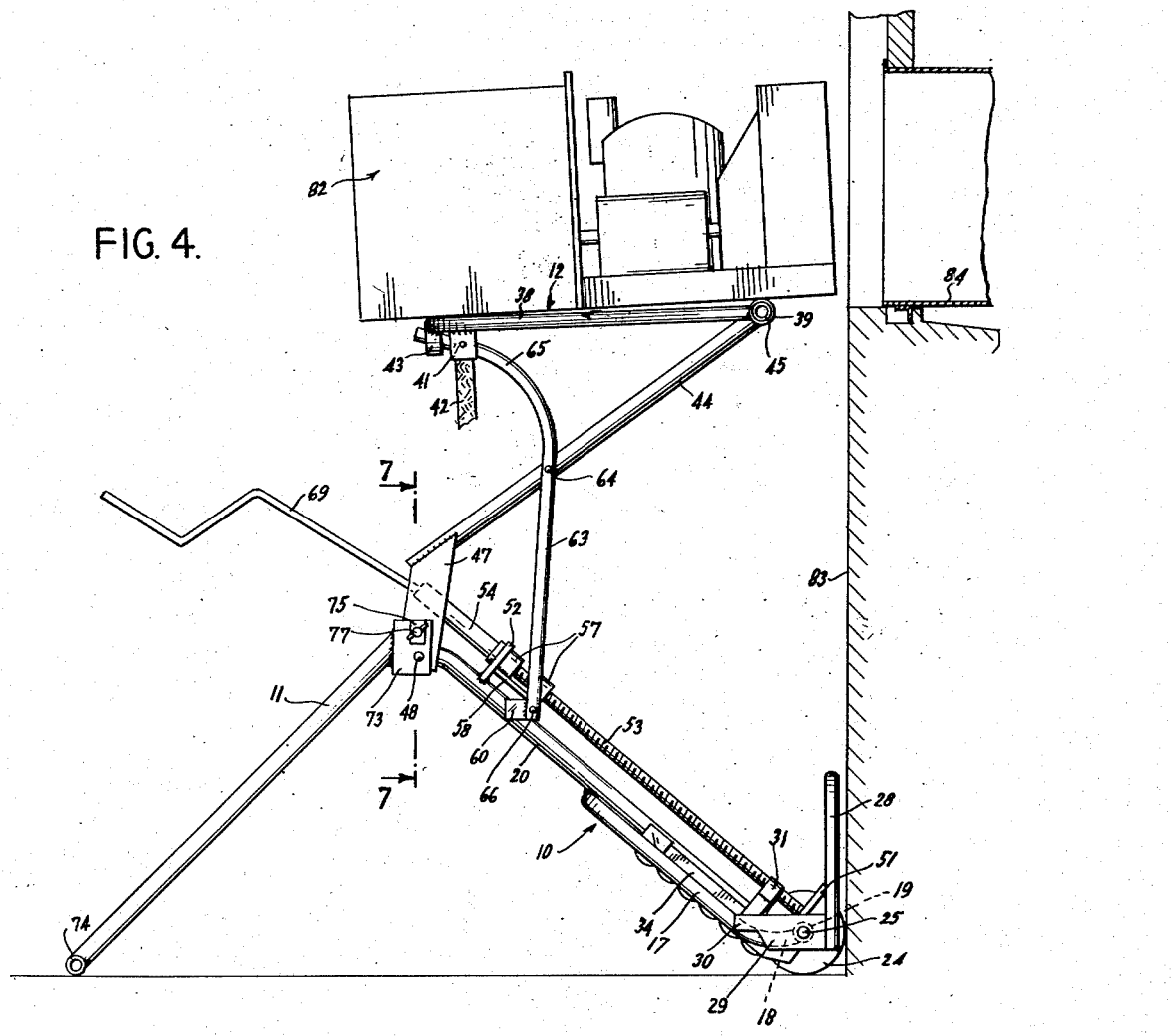
Fig. 4 is a side elevational view showing the device in operation as a stand or rest with the supporting member or carriage elevated to its maximum height, and the air-conditioner chassis in the process of being slid into its cover mounted in a window casing.

More specifically, the frame 10 includes a tubular, U-shape member 15 having a rearwardly-disposed bight portion 16 and forwardly extending legs 17, 17. The legs are formed with their front end portions 18, 18 curved upwards, as best seen in Figs. 3 and 4. Extending laterally between the front ends of the legs 17, 17, and fixedly secured thereto, is an open ended journal tube or pipe 19. A longitudinally disposed, tubular center bar 20 has its forward end portion 21 fixed, as by welding or other suitable means, to the underside of the journal tube 19, medially thereof, and extends rearwardly over and beyond the bight portion 16, having its rearward end portion 22 angulated downward, as shown in Fig. 2. An intermediate portion of the center bar 20 is also fixed by welding or other suitable means to the bight portion 16, so that the U-shaped member 15, journal tube 19 and center bar 20 combine to provide a relatively staunch and rigid structure defining the frame 10.

A pair of laterally spaced, coaxial wheels 24, 24 are journaled at the front end of the frame 10, as by a rod or axle 25 extending through the tube 19 and the wheels. Thus, the wheels 24, 24 are rotatably mounted on the frame 10, and adapted for rolling engagement with a supporting ground surface to afford mobility to the frame.

A U-shaped nose-piece or platform 28, preferably fabricated of pipe stock or other suitable material, extends laterally or transversely of the frame 10 just in front of the tube 19, and is mounted for rotation about the rod or axle 25 by a pair of plates 29, 29 each fixed to one end of said nose-piece 28 and rotatably mounted on the rod or axle 25 at opposite ends of the tube 19. That is, each of the mounting plates 29 is pivoted intermediate its ends about the axle 25, and is fixed at one end, as by welding or the like, to one end of the U-shaped nose-piece 28 to mount the latter for rotation about the rod 25. The free end of each mounting plate 29, remote from the nose-piece 28, is formed with a narrow extension 30; and, a pair of upstanding, downwardly opening hooks or stop members 31 are fixed to the opposite legs 17, 17 of the frame 10 to receive the extensions 30 and limit rotation of the nose-piece 28 away from the frame to a position substantially normal to the latter, as seen in Fig. 2.

Fixed to the leg portions 17, 17 of the frame 10 are a pair of roller units 34, 34, which extend below the frame for traversal of the treads of staircase or other abutments, as appears more fully in my copending patent application, Serial number 361,485, filed June 15, 1953 and since issued as Patent No. 2,772,096.

The supporting member or carriage 12 may also be formed of a tubular, U-shaped member 36 similar to but preferably larger than the U-shaped member 15. In particular, the U-shaped member 36 includes a rearwardly disposed bight portion 37, and a pair of forwardly extending parallel legs 38, 38 provided on their front ends with a pair of horizontally disposed, spaced alined journal sleeves 39, 39. Attached to the undersides of the supporting member legs 38, 38, by fasteners 41, 41 are a pair of complementary belt or strap pieces 42, 42. A pair of guide lops 43, 43 are arranged in side by side relation and fixed to the underside of the bight portion 37 symmetrically thereof and opening forwardly and rearwardly with respect thereto.

The carriage elevating structure 13 includes a tubular elevator link or strut 44 provided with a laterally or transversely extending cross-piece 45 on its front end. The cross-piece 45 has its opposite ends rotatably received in the alined sleeves 39, and a pair of studs 46, 46 are fixed in the cross-piece in engagement with the alined sleeves to limit lateral movement of the cross-piece 45 and prevent its withdrawal from the tubes. In this manner, the elevator link 44 has its front end pivotably connected to the front end of the support member 12. On the rear end of the elevator strut or link 44 are fixed a pair of facing spaced plates 47, 47 disposed in parallelism with each other and angulated downwards from the elevator link on opposite sides of the rear center bar portion 22. A horizontally disposed pivot pin 48 extends laterally or transversely through the plates 47, 47 and the center bar portion 22 to mount the elevator link 44 for swinging movement relative to the frame 10 about the axis of the pin 48.

The actuating mechanism includes a pair of spaced, upstanding plates or brackets 51 and 52 fixedly secured to the upper side of the frame center bar 20 adjacent its front and rear ends, respectively, and an elongated threaded member or lead screw 53 disposed above and axially alined with the center bar with its opposite ends rotatably journaled in the plates 51 and 52. Fixed to the rearward end of the lead screw 53, in alinement therewith, and extending rearwardly of the plate 52 into the space between the plates 47, 47 is a tubular member 54 having its rearward end portion 55 of an ovaloid cross-sectional configuration, as is best seen in Fig. 7. A follower, generally designated 56, is disposed in non-rotatable, threaded engagement with the lead screw 53 for movement longitudinally of the latter upon rotation thereof, and includes a pair of internally threaded annular members or collars 57 circumposed in threaded engagement about the lead screw and fixedly secured together in spaced apart relation by a plate 58 disposed between the lead screw 53 and center bar 20. The plate 58 has its forward end portion 59 bent or curled downwards and rearwards, for a purpose appearing presently, and is provided with a pair of laterally spaced ears 60, 60 fixedly secured to the platee and depending therefrom on opposite sides of the frame center piece to prevent rotation of the follower about the lead screw.

A substantially identical pair of operating links or struts 63, 63, forming part of the carriage elevating structure 13, are disposed in parallel relation with respect to each other on opposite sides of and in crossed relation with respect to the elevator link 44. More specifically, the operating links 63 extend crosswise of the elevator link 44 and each has an intermediate portion pivoted to an intermediate portion of the elevator link by a single pivot pin 64. The free end portions of the operating links 63, 63 are curved rearwards, as at 65, 65, each extending slidably through one of the guide loops 43, 43, while the opposite ends of the operating links are disposed on opposite sides of the follower plate 58 and pivotally connected to the follower by a pin 66 extending through the operating links and the curled plate portion 59. The front ends of the operating links 63 are thereby connected to the frame 10 for back and forth movement therealong upon rotation of the lead screw 53. One operating link may of course be omitted without affecting the function of the other, but the pair is preferred for purposes of rigidity. A hand crank 69 is formed with a flattened end 70 non-rotatably engageable in the ovaloid tube portion 55 to effect lead screw rotation.

The handle 11 has a U-shaped coupling member 73 welded or otherwise fixed on one end and a cylindrical or tubular cross member 74 fixed on its other end. The coupling member 73 is disposed astride the elevator link plates 47, 47 and also receives the pivot pin 48, as shown in Fig. 7, so as to connect the handle 11 to the frame for swinging movement about the transverse, horizontal axis of the pivot pin 48.

Fast to one leg of the U-shaped coupling 73, exteriorly thereof, is a U-shaped spacer member 75 having disposed therein and in threaded engagement therewith an elongated member or screw 76. One end of the elongated screw 76 extends exteriorly of the spacer 75 and is provided with a wing nut 77 or other manually rotatable means, while the other end of the screw is provided with an axial pin 78 removably insertable through holes 79 and 80 formed in one leg of the coupling member 73 and one of the plates 47, respectively. More specifically, the holes 79 and 80 are movable into registry, the condition illustrated in Fig. 7, upon swinging movement of the handle 11 about the pivot pin 48 into end to end, substantial alinement with the elevator link 44, whereupon the nut 77 may be rotated to move the threaded member 76 inwards and pass the pin 78 into the registering holes 79 and 80. In this condition, the handle 11 will be held substantially rigid with respect to the elevator link 44, so that the handle and elevator link are constrained to unitary rotation about the pivot pin 48. Upon withdrawal of the pin 78 from the registering holes, the handle 11 is free to rotate about the pivot pin 48 relative to the frame 10 and elevator link 44.

When the handle 11 and elevator link are rigidly secured together by the pin 78, rotation of the lead screw 53 as by means of the crank 69, will move the front ends of the operating links 63 along the frame and effect unitary swinging movement of the handle 11 and elevator link 44.

As seen in Fig. 2, such unitary rotation in the clockwise direction will effect lowering of both the elevator link 44 relative to the frame, and the frame bar 20 relative to the supporting ground surface, while unitary rotation of the handle and elevator link in the counterclockwise direction will effect elevation of both the frame relative to the ground and elevator link relative to the frame. Stated otherwise, the rear end of the frame will be elevated with respect to the ground, and the front end of the elevator link will be elevated with respect to the rear end of the frame, so that elevation of the frame augments or increases elevation of the elevator link. The front end of the support member 12 is of course raised and lowered with the front end of the elevator link being pivotally connected to the latter. Further, the curved portions 65, 65 of the operating links 63, 63 slide in the guides 42, 42 in supporting engagement with the rear end of the carriage 12 upon actuating of the lead screw and are properly curved to provide the cam action necessary for maintaining the supporting member substantially horizontal or level at all elevations of the latter.

In Figs. 3 and 4, the hand-truck of the instant invention is illustrated in typical conditions of use during the installation of a window air-conditioning unit generally designated 82. The lead screw 53 is first rotated, as by the hand crank 69, to shift the follower 56 to its forwardmost position. This of course moves the support member 12 into position closely overlying the frame 10, so that the appliance may be placed upon the support member and held thereon by the strap 42 and nose-piece 28. In this condition the hand-truck may be operated in the conventional manner for transporting the appliance along substantially level ground and may be used as a skid or for traversing stairs by bringing the roller units 34, 34 into play. When the hand-truck and its load have been moved adjacent to the desired window, the truck is placed in the generally horizontal position of Fig. 3 with the retaining member 28 adjacent to the window wall, and the wheels 24, 24 and handle cross-piece 74 in engagement with the floor. The crank is then employed to rotate the lead screw and move the front ends of the operating links 63, 63 rearwards, which of course effects unitary pivoting of the handle 11 and elevator link 44 in the counter-clockwise direction to raise the supporting member 12 and its load. Viewed otherwise, the handle 11 and frame 10 are scissored or pivoted together about the pin 48, while the operating links 63 and elevator link 44 are simultaneously scissored about the pivot pin 64 to further increase elevation of the supporting member. When the supporting member has attained its desired elevation, the truck, which is now functioning as a relatively stable stand or rest for the load, may be moved into closely proximate relation with respect to the window wall, designated 83 in Fig. 4. For this purpose, the nose-piece 28 is rotated to an upright position, to provide clearance of the wall 83. The air-conditioner chassis 82 may now be relatively easily slid substantially horizontally, and accurately positioned in its window casing 84.

The crank 69 is then reversely rotated to move the follower 56 to its forwardmost position, thereby moving the support member 12 to its lowermost position. If desired, the tubular link 44 may be left with its rear end open for receiving and storing the crank 69 in the collapsed truck position, as shown in Figs. 6 and 8, and the link 44 may be provided with an internal resilient strip or lead 85 adapted to snap about the pivot pin 64 to frictionary retain the crank within the link 44 when not in use. The pin 78 may now be withdrawn from the holes 79 and 80, as by rotation of the wing nut 77, permitting swinging movement of the handle 11 about the pivot pin 49 to a collapsed position substantially coextensive with the frame center bar 20, as shown in Fig. 6. The support member, its elevating structure, and the handle, are thereby moved to a relatively compact collapsed condition, occupying a minimum of space, and may be firmly retained in their compact relation by strapping the belt 42 about the handle 11, as shown in Fig. 6. In this condition, the device is readily adapted to be carried in one hand, leaving the other hand free for tools or the like.

Of course, the hand-truck may be employed as a stand or rest to remove the air-conditioner from its casing, and may be raised or lowered to a desired position affording maximum access and convenience for making repairs.

From the foregoing, it is seen that the present invention provides a hand-truck which fully accomplishes its intended objects, and which is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A hand-truck comprising a frame, a pair of spaced ground engaging wheels journaled at the front end of said frame, a handle extending longitudinally from and pivotally connected to the rear end of said frame for swinging movement about a transverse horizontal axis, a supporting member arranged above said frame, an elevator link having its front end pivotally connected to said supporting member and having its rear end pivotally connected to said frame for swinging movement relative to the latter about said horizontal axis, means releasably securing said elevator link and handle in rigid substantially end to end relation for unitary rotation about said horizontal axis, an operating link pivoted intermediate its ends to an intermediate portion of said elevator link, actuating means connecting one end of said operating link to said frame for back and forth movement therealong to raise and lower the front end of said elevator link and hence said supporting member, said unitary rotation serving to move the distal end of said handle along a ground surface toward said frame to increase the elevation of said supporting member, and cam means on the other end of said operating link in engagement with said supporting member to maintain the latter horizontal during said raising and lowering.

2. A hand-truck according to claim 1, in combination with a retaining member pivotally connected to the front end of said frame and normally extending generally upwards from the latter for holding an article on said supporting member when said frame is inclined at an angle to the horizontal.

3. A hand-truck according to claim 1, said cam means comprising a curved portion on the other end of said actuating link slidably engageable with the underside of said supporting member upon raising and lowering of the latter.

4. A hand-truck according to claim 1, said actuating means comprising a lead screw arranged longitudinally of and rotatably mounted on said frame, and a follower in non-rotatable threaded engagement with said lead screw and pivotally connected to said operating link, whereby rotation of said lead screw effects back and forth movement of said follower and said one end of said operating link.

5. A hand truck comprising a frame, an elongated handle pivotally connected to said frame, and a load-supporting assembly carried by said frame and movable between a collapsed position adjacent the frame and an extended position above said frame, said assembly including an elevating member and an operating member pivotally connected intermediate their ends, a load-supporting platform carried by said members, the elevating member being connected to and co-extensive with said handle, means for mounting the end of said operating member on said frame for movement along the axis thereof, and means for moving the end of said operating member along said frame to vary the spacing between said load-supporting platform and said frame and to vary the angle between said handle and said frame.

6. A combined hand truck and lift truck for transporting a load and lifting said load vertically, said hand truck comprising a frame having a pair of wheels at one end thereof, an elongated handle pivoted to the other end of said frame, an elevator member co-extensive with said handle, a load-supporting frame pivotally mounted at one end to the free end of said elevator member, an operating link supporting the other end of said load-supporting frame through a sliding connection, said operating link being pivotally connected intermediate its ends to the elevator member, a lead screw journalled on said frame and extending axially therealong, a follower in non-rotatable threaded engagement with said lead screw and pivotally connected to said operating link, and means for turning said screw to move the follower forwardly and rearwardly on said lead screw, said follower being movable to the forward end of said truck frame to bring the hand truck to a collapsed position for transporting said load, said follower being movable rearwardly to bring said hand truck to extended positions for lifting the load, in which the handle and truck frame are disposed angularly to each other and to the ground support surface with the truck resting upon said handle and said wheels, and the load-supporting frame raised above said truck frame.

7. A hand truck according to claim 6 in which said operating link is bent arcuately at its end engaging said load-supporting frame at said sliding connection, whereby said load supporting frame is maintained in a horizontally-disposed position as it is raised relative to said truck frame.

8. A hand truck according to claim 6 in which the means for turning said screw comprises a crank removably connected to the end of said screw.

9. A combined hand truck and lift truck for transporting a load and lifting said load vertically, said hand truck comprising a frame having a pair of spaced ground engaging wheels journalled at the forward end thereof, a handle member, an elevator link joined to one end of said handle member and substantially co-extensive therewith, a first pivot connecting said handle member and elevator link at their junction to the rear end of said frame, a load-supporting member pivotally connected at its forward end to the free end of said elevator link, an operating link pivoted intermediate its ends to an intermediate portion of said elevator link at a second pivot, actuating means connecting one end of said operating link to said frame for movement along the axis of said frame, the operating link having an arcuately-bent free end, and means slidably connecting the arcuate end of said operating link to the rear end of said load-supporting member, said actuating means being operable to move the end of said operating link to the forward end of said frame, thereby bringing said hand truck to a collapsed transporting position in which the handle is disposed substantially co-extensive with said frame and the operating link and load-supporting member are proximate to and substantially parallel with said frame, said actuating means being also operable to move the end of said operating link rearwardly of said frame, thereby bringing said hand truck to an extended lift position in which the handle is disposed angularly to said frame, the truck is resting upon the free end of said handle and said wheels, the operating member and elevator member are disposed angularly to each other and to the frame and are upstanding from the frame, and the load supporting member is horizontally disposed above the frame.

References Cited in the file of this patent

UNITED STATES PATENTS

| 635,037 | Buck | Oct. 17, 1889 |
|---|---|---|
| 887,821 | Lang | May 19, 1908 |
| 1,423,366 | Snook | July 18, 1922 |
| 1,900,528 | Statz | Mar. 7, 1933 |
| 2,521,214 | Goeller | Sept. 5, 1950 |
| 2,565,237 | Kinter | Aug. 21, 1951 |
| 2,637,449 | Hamer | May 5, 1953 |

FOREIGN PATENTS

| 667,386 | Great Britain | Feb. 27, 1952 |